3,197,275
PROCESS FOR THE PRODUCTION OF ALKALI METAL CYANATES
Tomiro Iwai, Tokyo, Japan, assignor to Sakae Food Stuff Industry Co., Ltd., Tokyo, Japan, a corporation of Japan
No Drawing. Filed Apr. 12, 1963, Ser. No. 272,514
Claims priority, application Japan, May 9, 1962, 37/18,113
4 Claims. (Cl. 23—75)

This invention relates to a process for industrially cheaply producing alkali metal cyanates of a high purity containing no virulent cyanide by reacting urea and alkali metal carbonate directly with each other under heating.

It is generally known that alkali cyanates have peculiar effects as herbicides against annual weeds in the field of farming. However, with known conventional processes, their cost of production is so high that they have been hardly utilized as agricultural chemicals. Also with the conventional processes, due to the by-production of virulent cyanides, their utilization has been in abeyance.

Further, they are also very useful as raw materials for chemical syntheses. However, it is needless to say that they are also required to be cheap and high in purity.

Much research has been done for a long time on processes for synthesizing alkali metal cyanates. For example, a process of oxidizing an alkali metal cyanide with an oxidizing agent or of oxidizing electrolytically the same is popular. However, it is evident from the viewpoint of the price of the raw material that this process is costly.

There is another process wherein urea and alkali metal carbonate are reacted with each other. However, in such process, a mixture of urea and alkali metal carbonate is melted mostly at a temperature near the melting point of an alkali metal cyanate or at about 450–550° C. (the melting point of potassium cyanate is about 450° C. and that of sodium cyanate is about 550° C.) in obtaining the product.

In such process, due to the high temperature, impurities will be by-produced, especially the amount of production of alkali metal cyanide is large and many difficulties arise in protecting the reaction chamber against chemicals and heat. Further, urea which is one of the raw materials is so unstable against the high temperature that there is a great loss of urea resulting from sublimation and decomposition. Therefore, a large amount of urea is used from the first in anticipation of the loss so that the mol ratio of the raw materials in the mixture may be about 2.3–2.6 mols of urea to 1 mol of alkali metal carbonate (theoretically urea:alkali metal carbonate=2 mols:1 mol) and yet it is reported that the purity of the obtained product will be about the same as in the present invention, i.e., 85–95%, or the rate of yield will even be lower, i.e., 85–90%, than in the process of the present invention and the very toxic alkali cyanide will be in the large amount of 0.1–1%. By taking the wear of the reaction chamber and the comparatively high fuel consumption into consideration in addition, said process can not be said to be adapted for the above mentioned object.

According to the present invention, the equivalents of urea and alkali metal carbonate are not mixed from the first but only alkali metal carbonate is heated to accumulate heat and urea is added little by little thereto so as to react while being stirred and mixed so that the above mentioned defects may be eliminated and alkali metal cyanate may be obtained. The product obtained by this process contains 85–95% of the alkali metal cyanate and a trace or an undetectable amount of an alkali metal cyanide. The yield reaches 96%–99%. Further, when taking the reduction in amount of urea to be used, the economy of the fuel, the increase of the range of selection of the reaction chamber and the high number of years of durability thereof into consideration, the production cost in the process of the present invention will be much lower than in any known process.

In the case of reacting urea and alkali metal carbonate directly without any solvent under heating, the reaction will be performed in the so-called solid-liquid reaction, i.e. liquid urea and solid alkali metal carbonate. Here, against heat, alkali metal carbonate will be very stable but urea will be considerably more unstable and therefore likely to sublime and decompose.

Under such conditions, in order to make them react most smoothly, it is necessary to make their contact area in the solid-liquid reaction as large as possible. For this purpose, attempts have heretofore been to mix urea and alkali metal carbonate as completely as possible and also have them crushed as finely as possible. However, even if the fineness of solid grains and the mixing of solids themselves are improved as much as possible, the increase of the contact area by such means will be limited.

Further, in such a process, urea will have to be used in excess in order to obtain a product of a high quality, and a loss of urea will be inevitable.

Therefore, with an aim to positively widen the contact area, the present invention aims to react urea and alkali metal carbonate with each other under a condition, under which both components may be stirred and mixed consistently from the time prior to the reaction to the completion thereof. For this purpose, in the process of the present invention only alkali metal carbonate alone is first heated, and after having reached the reaction temperature of 150° to 350° C. a small amount of urea is gradually added to said heated alkali carbonate so as to react gradually while being stirred and mixed, contrary to the conventional process of mixing the equivalents of urea and alkali carbonate at the same time from the beginning with a subsequent heating thereof. This process of the present invention proved to be very advantageous.

As soon as the small amount of urea added comes into contact with the heated alkali metal carbonate, the former is melted, receiving the heat from the latter. (The melting point of urea is 132.50° C. The decomposing point of alkali metal carbonate is above 850° C.) The liquid urea covers the surface of the solid alkali metal carbonate and begins to react with it on surface contact, thereby no chance is given to urea of subliming and decomposing. Thus, there occurs substantially no loss of urea.

In adding urea to alkali metal carbonate it may be possible to add urea of a constant amount little by little. But, in such case a long time will be required for the completion of the reaction. Therefore, with a view to industrial mass production a special method of adding urea is adopted in practice in the present invention in order to complete the reaction within a time as short as possible, i.e. a method of adding a large amount of urea in the initial period and of gradually lessening the amount of urea to be added in the intermediate period of the reaction.

In the present invention, as long as there is a large amount of alkali metal carbonate in the initial reaction chamber, a large amount of urea is added but as the reaction gradually proceeds the amount of the alkali metal cyanate produced by the reaction increases and the amount of alkali metal carbonate decreases, the amount of urea to be added is decreased. The result has proved to be very favorable. According to experiments, in the method wherein urea was added by a constant amount, in order to obtain substantially the same purity and yield as in the method of the present invention, the reaction time had to be nearly twice as long as in the present invention and, on the contrary, when the reaction was carried out for the same reaction time as in the present invention, the loss of urea and the production of impurities occurred in the latter half of the reaction process, and, as a result, such purity and yield as in the method of the present invention could never be obtained.

Next, there is a problem of heat transmission in heating. In the process disclosed in the specification of U.S. Patent No. 1,915,425 to Harry Kolepfer, wherein a raw material mixture prepared by mixing urea and alkali metal carbon crushed as finely as possible is heated, urea has a lower melting point and therefore melts first and, thus, the powdered alkali metal carbonate is suspended therein. The reaction starts on surface contact and the discharge of ammonia gas starts at 130–140° C. and continue for a certain time. In this stage, the heat transmission will be comparatively favorable and the stirring and mixing operation will be possible. However, when the discharge of ammonia has finished, a very hard block will have been produced in the bottom of the reaction chamber.

Now, with this much heating, the amount of an alkali cyanate in the product will be so small that the product must be subjected to a further heating, so that a good part of it is converted to alkali metal cyanate. However, in this method it is suggested that the product obtained by heating in the first step is at once taken out of the chamber, crushed and then further reheated at about 150° C. But since the very hard block, described above, will have stuck to the bottom of the chamber, it will be very difficult to take the product out of the chamber.

Further, with the heating at about 150° C., the reaction will take a very long time and will be very uneconomical. If the reaction is to be made to proceed within a short time, the heating itself in this second step will be very problematical, because the heat transmission of the powdered solid is so low that the temperature gradient between the surface of the powdered solid and the part thereof in contact with the heat receiving surface of the reaction chamber will be very large. If the material is strongly heated, therefore, the heat receiving surface of the reaction chamber will be overheated concurrently with the progress of the reaction and the decomposing reaction of the product will also progress from that part. On the other hand, if said heat receiving surface is heated to a proper degree, the upper part of the material will not react and the product will remain an intermediate of the reaction. Therefore, in the above mentioned U.S. Patent the measure is taken of expanding the raw material mixture into a layer as thin as possible. Such a measure may well be carried out in a laboratory, but, it will not be economically feasible, because a reaction chamber having a huge floor will be required. There is also another method of making the reaction proceed at once, wherein the reaction is carried out at high temperature of about 450–550° C. within a short time. But, this method also is accompanied with defects such as the by-production of impurities and the reduction of durable years of the reaction chamber as a result of the reaction at high temperature.

In order to eliminate the above mentioned defects the method of heating according to the present invention is characterized by the fact that the material is subjected to heating under conditions that it can always be stirred and mixed and thereby the temperature gradients within the reaction chamber may be possibly minimized.

Though the temperature gradients within the reaction chamber may be lessened by stirring and mixing the material, the occurrence of temperature gradients of some extent, particularly between the heat receiving surface, the central part and the surface of the powdered solid, is inevitable, contrary to the liquid, and a considerable amount of heat is taken away by ammonia and carbon dioxide or steam generated in a large amount during the reaction. Thus, preheating alkali metal carbonate is done in the present invention in order to solve this problem.

As the decomposing point of alkali metal carbonate is above 850° C., it will not be likely to begin to melt and decompose at the heat receiving surface, even if strong heat is applied to same. Therefore, alkali carbonate alone is first put into a reaction chamber and is strongly heated while being stirred and mixed so that the temperature of the contents may be elevated. The urea is gradually added thereto. As the production of the alkali metal cyanate in the reaction mixture progresses, the degree of heating is reduced. That is to say, most of the heat required for the reaction is given to the alkali metal carbonate prior to the reaction so as to accumulate heat, then the reaction is started and thereafter the heating is weakened in proportion to the amount of addition of urea or in inverse proportion to the amount of production of the alkali metal cyanate. If the heating is not lessened, the product on the botom of the reaction chamber will melt and decompose, thereby making the stirring and mixing of the material impossible, which will result in reducing the purity of the product and the yield thereof. By gradually lessening the heating during the progress of the reaction, the reaction may proceed favorably without melting and decomposing of the product on the bottom of the reaction chamber, and not wasting urea nor having by-production of impurities. A very favorable result has been obtained in the process according to the present invention, wherein, after initial heating of alkali metal carbonate to about 350° C. in order to accumulate heat, urea was added, the amount of addition of urea was reduced with the lapse of time and the temperature of the reaction mixture was reduced accordingly and was again elevated at the end of the reaction after the addition of urea was completed so that the reaction completing time might be reduced. The reaction temperature of the mixture should be limited to a range of 350 to 150° C. It is, of course, possible to keep the reaction temperature at a constant temperature in the range of 350 to 150° C.

It has been further proved by experiments that in the process of the present invention, it is useless to have more urea than the mol ratio of urea to alkali metal carbonate. Though the theoretical mol ratio of urea to alkali metal carbonate is 2:1, it is a feature of the present invention to have the raw material mixing ratio of urea to alkali carbonate=2.0–1.6 mols:1 mol. The ratio of about 1.7–1.8 mols:1 mol is preferred. In case urea is used in excess, the excess of urea will not contribute to the reaction with the alkali metal carbonate but will be sublimed and wasted by heating or will produce impurities and will result in the reduction of the purity and yield of the final product.

According to experiments, in case the reaction was carried out at a mol ratio of urea:alkali metal carbonate =2.3 mols:1 mol, such impurities as biuret, cyanuric acid and cyamelide were seen to be produced and no improvement in the purity corresponding to 0.3 mol of urea was obtained. The purity of the product obtained in this case was 85–90% and the yield was 90–95%. According to experiments, at a ratio of urea:

sodium carbonate=120 kg.:100 kg. (2.12:1)

the purity was 85% and the yield was 123 kg. Further, at a ratio of urea:

sodium carbonate=110 kg.:100 kg. (1.9:1)

the purity as 82% and the yield was 120.5 kg. At a ratio of urea:

sodium carbonate=80 kg.:100 kg. (1.4:1)

purity was 76% and the yield was 115 kg.

*Example*

100 kg. of soda ash were put into a flat kettle made of iron, 1 meter in diameter, 0.5 meter deep, enclosed with a furnace and provided with a mixing and stirring and were strongly heated from below with a heavy oil burner while being stirred and mixed so that the temperature of the soda ash might be about 350° C. 100 kg. of urea were continuously added thereto by means of a screw conveyor fitted to the upper part of the kettle at the following rates:

First 1 kg./min. for 40 minutes, then 0.67 kg./min. for 60 minutes and finally 0.2 kg./min. for 50 minutes.

After the completion of the addition of urea, the stirring was continued until the discharge of ammonia stopped. The time when the smell of ammonia substantially vanished was made the time of completion of the reaction.

The temperature variation with the lapse of time in the above reaction is shown below.

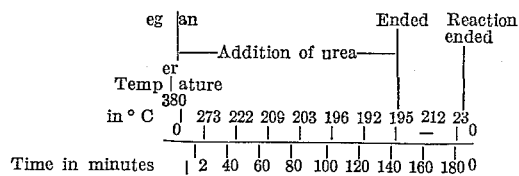

The yield of the product was 118.65 kg. Sodium cyanate was 90.3%. The greater part of the rest was unreacting soda ash. No sodium cyanide was detected.

What I claim is:

1. A process for the production of alkali metal cyanate by the reaction between urea and alkali metal carbonate, which comprises heating the alkali metal carbonate to a temperature of about 150°–350° C., thereupon mixing and stirring urea slowly and in progressively decreasing amounts with the preheated alkali metal carbonate, the mole ratio of urea to alkali metal carbonate being about 2.0–1.6:1, maintaining the temperature of the so-obtained reaction mixture constantly within the range of about 150°–350° C., the temperature being decreased within said temperature range during the mixing of the urea and the alkali metal carbonate and then being raised within said range upon completion of the addition of the urea.

2. A process according to claim 1 wherein the mole ratio of urea to alkali metal carbonate is about 1.8–1.7:1.

3. A process according to claim 1 wherein the urea is mixed with alkali metal carbonate in 140 minutes.

4. A process according to claim 1 wherein the alkali metal carbonate is sodium carbonate.

References Cited by the Examiner

UNITED STATES PATENTS 1,915,425 6/33 Kloepfer _____ 23—75
2,801,154 7/57 De Pree et al. _____ 23—75

FOREIGN PATENTS 339,220 12/30 Great Britain.

MAURICE A. BRINDISI, *Primary Examiner.*